UNITED STATES PATENT OFFICE.

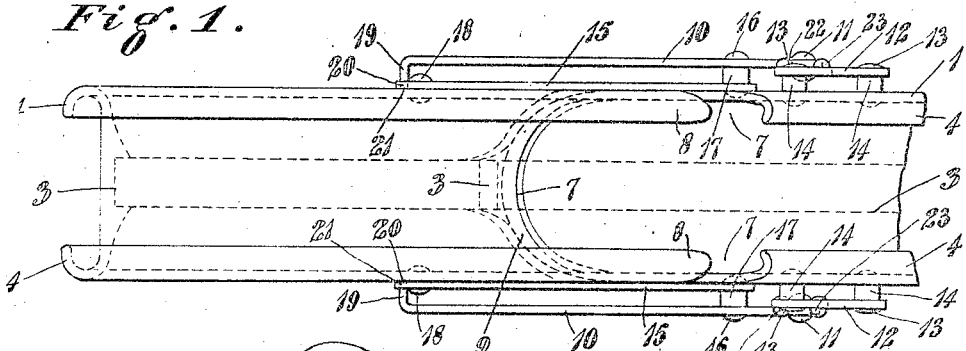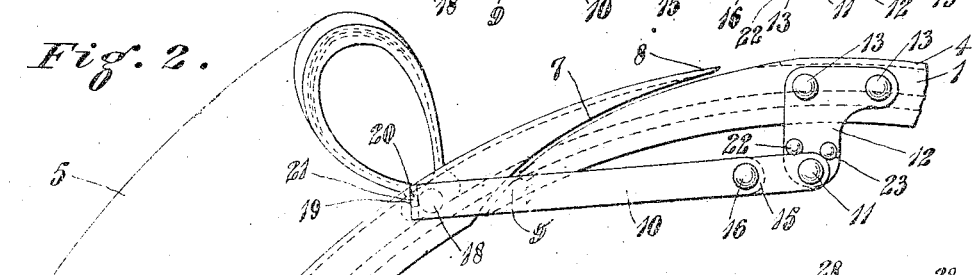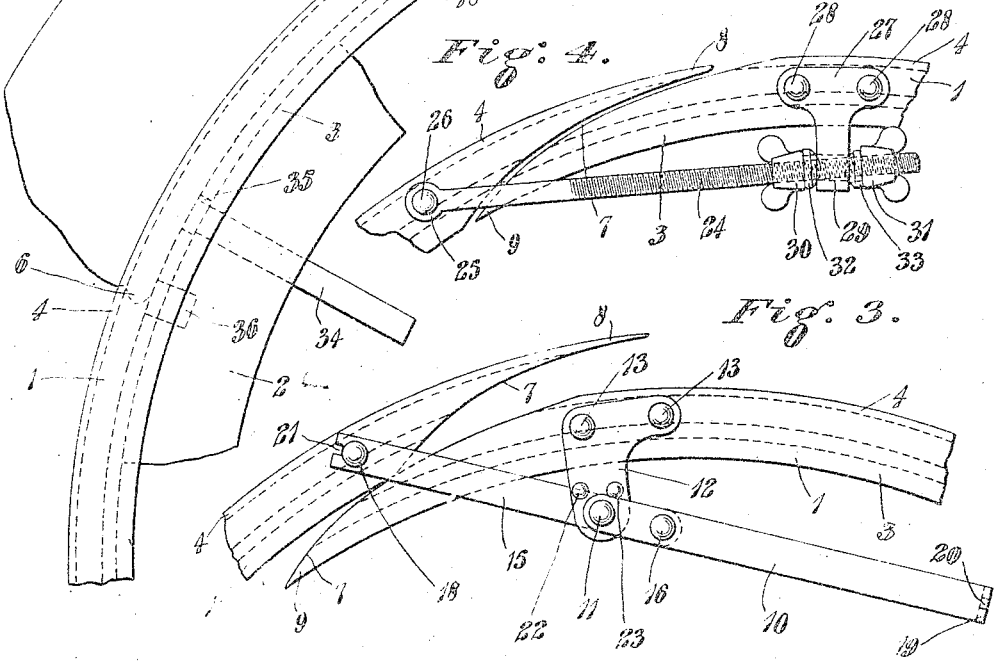

JOSEPH G. ROLF, OF COVINGTON, KENTUCKY.

RIM FOR VEHICLE-TIRES.

1,162,254.  Specification of Letters Patent.  Patented Nov. 30, 1915.

Application filed November 12, 1914. Serial No. 871,645.

*To all whom it may concern:*

Be it known that I, JOSEPH G. ROLF, a citizen of the United States, and a resident of Covington, in the county of Kenton and State of Kentucky, have invented certain new and useful Improvements in Rims for Vehicle-Tires, of which the following is a specification.

My invention relates to rims for vehicle wheels to hold resilient tires thereon; and its object is to facilitate the placing of the tire on the rim and its removal therefrom.

My invention consists in the parts and in the details of construction and arrangement of parts as will hereinafter be more fully described and claimed.

In the drawing: Figure 1 is a partial plan view of a wheel rim embodying my invention; Fig. 2 is a partial side elevation of the same, with part of the tire in place thereon; Fig. 3 is a partial side elevation of the same showing the rim in contracted condition; and Fig. 4 is a partial side elevation of a rim showing a modification of my invention.

The rim 1 is of the kind which may be taken from the wheel center, the felly 2 of which is shown in Fig. 2, this rim having an internal groove 3 by means of which it is secured to the felly 2, and having external inturned side flanges 4 which hold the tire 5 by engaging over a lateral projection 6 thereon. Demountable rims, like the rim 1, and of other designs, when made continuous, while readily demountable from the wheel center, have the tire 5 removed from them only with the greatest difficulty, it being necessary to pry the projections 6 from under the flanges 4 by the use of a suitable tool, and it even being necessary to use two such tools in doing this. In order to remove the tire from such a continuous rim it is necessary to stretch the tire, which is very heavy and strong, even if it be a pneumatic tire and be deflated; and if the tire is solid it even more strongly resists the stretching and distortion necessary to disengage it from the rim. Not only does the operation involve great labor, but even results in damage to the tire by the use of the tools thereon.

My invention involves the provision of a discontinuous rim which may be removed from the wheel center and then collapsed or contracted so that its exterior diameter is considerably reduced relative to the interior diameter of the tire, so that the excessive stretching of the tire in order to disengage it from the rim is almost wholly obviated, making it possible to remove the tire from the rim without the use of tools or prying, it being possible to pull the tire from its position with the bare hands in very much less time than has heretofore been required to remove the tire with the use of tools.

As exemplified herein the rim 1 has a cut 7 taken through it at a very low angle to its circumferential direction, leaving an outer lip 8 and an inner lip 9, which, when the rim is expanded to its normal condition, lie close enough to each other to afford the desired continuity of support of the tire 5 and its lateral projections 6, the inner lip 9 being supported against the wheel center.

For holding the rim 1 tightly around the wheel center a suitable clamp is provided, that shown in Figs. 1 to 3, inclusive, being preferred. Not only does this clamp hold the rim around the wheel center practically as rigidly as a continuous rim is held, but it also affords the means for contracting the rim when it is removed from the wheel center and of holding it contracted while the tire is being removed from the rim. This clamp comprises the lever 10 swinging on a pivot 11 in the bracket 12 which is fixed to the side of the rim 1 by rivets 13, around which are collars 14 spacing the bracket 12 out from the side of the rim. This bracket is thus fixed to the rim close to the beginning of the cut 7 and preferably on that side of the cut which has the lower lip 9. A short distance from the pivot 11 the lever 10 has the link 15 pivoted to it by means of a rivet 16 with a collar 17 around the rivet, spacing the link 15 inward from the lever 10. This link 15 extends over across the cut 7 and is pivoted to the side of the rim 1 by means of a rivet 18.

The parts are so proportioned and the various pivots so located, that the lever 10 and link 15 may be drawn parallel and thus bring the rim to its normal expanded condition, bringing the pivots 11, 16 and 18 into alinement, and thus holding the rim in its normal expanded condition by virtue of this alinement of the pivotal parts of the clamp. To hold the lever 10 and link 15 in such relative positions the lever 10 may have its end 10 bent inward and provided with a small lug 20, while the end of the link 15 adjacent to the pivot 18 may have a notch 21 in which the lug 20 engages and from which it may be disengaged by virtue of a slight amount of resiliency which the lever 10 has.

When the lever 10 is disengaged it may be swung inwardly of the rim around its pivot 11 until it has brought the pivot 16 on the other side of the pivot 11, as shown in Fig. 3, thereby drawing the inner lip 9 inward along the inner side of the part that has the outer lip 8 and materially contracting or decreasing the diameter of the rim. When the lever 10 has been swung so far over that it brings the pivot 16 diametrically opposite from the pivot 18, as shown in Fig. 3, the clamp will then hold the rim in its contracted condition for removal of the rim.

Stops 22 and 23 are provided above the pivot 11 on the bracket 12 and at opposite sides thereof to limit the outward swinging of the lever 10 so that the parts cannot be moved outward past their relative positions in which the pivots are brought into alinement either in the expanded or contracted condition of the rim, since such excessive movement of the parts would result in a beginning of contraction or expansion after the desired expansion or contraction has been accomplished, as the case may be. These stops may consist of rivets with their heads projecting far enough for the lever 10 to engage with them.

By spacing the bracket 12 out from the side of the wheel rim by means of the collars 14, and spacing the link 15 inward from the lever 10, which lever is pivoted on the outer side of the bracket 12, the link 15 is permitted to swing freely beyond the bracket 12 in the contracting operation of the clamp. Such a clamp as the one above described, is provided at each side of the rim across the cut 7 therein, and the two clamps thus provided are designed to be operated simultaneously in contracting or expanding the rim.

In the modification shown in Fig. 4 the rim 1 is like that shown in the preceding examples, and has a cut 7 forming an outer lip 8 and inner lip 9 as before described, but the clamp comprises the threaded rod 24 which has an eye 25 at one end, through which it is pivoted by means of a rivet 26 to the side of the rim preferably at that side of the cut 7 which has the lip 8, while on the other side of the cut is a bracket 27 fixed to the side of the rim by means of rivets 28 and having an opening 29 through which the threaded rod 24 extends, this rod 24 having screwed thereon at opposite sides of the bracket 27, winged nuts 30 and 31. Suitable convex washers 32 and 33 may be interposed between the nuts 30 and 31, respectively, at the adjacent sides of the bracket 27, to compensate for the swinging of the rod 24 with respect to the bracket as the clamp is operated to contract or expand the rim. With this modified construction the rim is contracted by screwing the nuts 30 and 31 over toward the pivot 26 and expanded by screwing them outward toward the free end of the rod 24, and such a clamp may be provided on each side of the rim.

It will be apparent that the device shown in Fig. 4 is not adapted to be operated as quickly as that shown in Figs. 1, 2 and 3, but may be desirable in some instances, especially with heavy rims where quick contraction by means of the lever and link clamp would require more exertion than the operator is capable of. However, most rims are sufficiently yieldable to permit the use of a clamp such as that shown in Figs. 1, 2 and 3.

As will be noted, the cut 7 is somewhat curved inwardly of the rim, thus shortening the cut and forming the lips 8 and 9 more blunt and thicker, as is desirable to give them the required strength.

Where a pneumatic tire is used, such as the tire 5 here indicated, the tire of course must have some means for inflating it, such as the stem 34, and the ring 1 is provided with an opening 35 through which the stem extends inwardly of the wheel and through the felly 2 of the center thereof. Also, the rim 1 has some means for engagement with the felly 2, such as the lug 36, to prevent the rim from turning with respect to the wheel center. Since the clamping means extends radially inward of the inner side of the rim at both sides thereof, it is desirable to locate both the opening 35 for the stem 34 and the lug 36 or similar means close to the cut 7 in the rim, so that the stem 34 and lug 36 or similar means may be inserted in their proper positions in the wheel center at the same time the clamping means is slipped inward over the sides of the wheel center.

While I have shown two examples of construction of my invention, it will be understood that other modifications are possible without departing from the scope of the following claims.

I claim—

1. A wheel rim adapted to hold a tire, said rim having a cut through it at a low angle to its circumferential direction, whereby an outer lip and an inner lip are formed, and the part having the inner lip being adapted to be drawn inwardly of the part having the outer lip, thereby contracting the rim for removal of the tire therefrom, and a clamp on said rim comprising a link pivotally connected to the side of the rim at one side of said cut, a bracket fixed to the rim at the other side of said cut and extending inwardly on the rim, a lever pivotally connected to the part of the bracket that extends inward, pivotal connecting means between the lever and the link, said pivotal connecting means and the pivotal connections of the link to the rim and the pivotal connection of the lever to the bracket being adapted to come substantially into alinement and hold the rim in expanded condition when the lever is swung to one side of the bracket, and to come substantially into other alinement to hold the rim in contracted condition when the lever is swung to the other side of the bracket, and stops on said bracket for said lever, to limit the swinging of said lever and maintain said alinements.

2. A wheel rim adapted to hold a tire, said rim having a cut through it at a low angle to its circumferential direction, whereby an outer lip and an inner lip are formed, and the part having the inner lip being adapted to be drawn inwardly of the part having the outer lip, thereby contracting the rim for removal of the tire therefrom, and a clamp on said rim comprising a link pivotally connected to the side of the rim at one side of said cut, a bracket fixed to the rim at the other side of said cut and extending inwardly on the rim, a lever pivotally connected to the part of the bracket that extends inward, pivotal connecting means between the lever and the link, said pivotal connecting means and the pivotal connections of the link to the rim and the pivotal connection of the lever to the bracket being adapted to come substantially into alinement and hold the rim in expanded condition when the lever is swung to one side of the bracket, and to come substantially into other alinement to hold the rim in contracted condition when the lever is swung to the other side of the bracket, stops on said bracket for said lever, to limit the swinging of said lever and maintain said alinements, and means for engagement between said lever and said link, near the pivotal connection of the link to the rim, to prevent said lever from swinging away from one of said stops.

3. A wheel rim adapted to hold a tire, said rim having a cut through it at a low angle to its circumferential direction, whereby an outer lip and an inner lip are formed, and the part having the inner lip being adapted to be drawn inwardly of the part having the outer lip, thereby contracting the rim for removal of the tire therefrom, and a clamp on said rim comprising a link pivotally connected to the side of the rim at one side of said cut, a bracket fixed to the rim at the other side of said cut and extending inwardly on the rim, a lever pivotally connected to the part of the bracket that extends inward, pivotal connecting means between the lever and the link, said pivotal connecting means and the pivotal connections of the link to the rim and the pivotal connection of the lever to the bracket being adapted to come substantially into alinement and hold the rim in expanded condition when the lever is swung to one side of the bracket, and to come substantially into other alinement to hold the rim in contracted condition when the lever is swung to the other side of the bracket, means spacing said bracket laterally from the rim where the bracket is fixed to the rim, said lever being pivoted on the laterally outward side of the bracket, and means spacing said link inward from the lever where it is pivoted to the lever.

4. A wheel rim adapted to hold a tire, said rim having a cut through it at a low angle to its circumferential direction, whereby an outer lip and an inner lip are formed, and the part having the inner lip being adapted to be drawn inwardly of the part having the outer lip, thereby contracting the rim for removal of the tire therefrom, and a clamp on said rim comprising a link pivotally connected to the side of the rim at one side of said cut, a bracket fixed to the rim at the other side of said cut and extending inwardly on the rim, a lever pivotally connected to the part of the bracket that extends inward, pivotal connecting means between the lever and the link, said pivotal connecting means and the pivotal connections of the link to the rim and the pivotal connection of the lever to the bracket being adapted to come substantially into alinement and hold the rim in expanded condition when the lever is swung to one side of the bracket, and to come substantially into other alinement to hold the rim in contracted condition when the lever is swung to the other side of the bracket, means spacing said bracket laterally from the rim where the bracket is fixed to the rim, said lever being pivoted on the laterally outward side of the bracket, means spacing said link inward from the lever where it is pivoted to the lever, said link having a notch near its pivotal connection to the rim, and said lever having its end part bent toward the lever, and a lug on said end part to engage in said notch, to hold said lever and link in relative positions wherein their pivotal connections are maintained substantially in alinement, to hold the rim in expanded condition.

JOSEPH G. ROLF.

Witnesses:
JAMES N. RAMSEY,
CLARENCE PERDEW.